(12) United States Patent
Weinzierl et al.

(10) Patent No.: US 8,391,998 B2
(45) Date of Patent: Mar. 5, 2013

(54) METHOD FOR CONTROLLING AND/OR REGULATING AN INDUSTRIAL PROCESS

(75) Inventors: Klaus Weinzierl, Nuremberg (DE); Klaus Franz, Nuremberg (DE); Stefan Schmors, Worpswede (DE)

(73) Assignee: Siemens Aktiengesellschaft, Munich (DE)

( * ) Notice: Subject to any disclaimer, the term of this patent is extended or adjusted under 35 U.S.C. 154(b) by 872 days.

(21) Appl. No.: 12/447,783

(22) PCT Filed: Aug. 30, 2007

(86) PCT No.: PCT/EP2007/059053
§ 371 (c)(1),
(2), (4) Date: Apr. 29, 2009

(87) PCT Pub. No.: WO2008/043603
PCT Pub. Date: Apr. 17, 2008

(65) Prior Publication Data
US 2010/0100218 A1    Apr. 22, 2010

(30) Foreign Application Priority Data
Oct. 9, 2006 (DE) .......................... 10 2006 048 031
May 31, 2007 (DE) .......................... 10 2007 025 447

(51) Int. Cl.
*G05B 13/02* (2006.01)
(52) U.S. Cl. ........................ 700/31; 700/103; 700/108
(58) Field of Classification Search ............... 700/31, 700/28, 29, 104, 108, 103
See application file for complete search history.

(56) References Cited

U.S. PATENT DOCUMENTS

| | | | |
|---|---|---|---|
| 4,796,194 A * | 1/1989 | Atherton | 700/103 |
| 5,251,144 A * | 10/1993 | Ramamurthi | 700/177 |
| 5,386,945 A | 2/1995 | Nose et al. | |
| 5,462,613 A * | 10/1995 | Glodowski et al. | 148/500 |

(Continued)

FOREIGN PATENT DOCUMENTS

| | | |
|---|---|---|
| DE | 43 25 187 A1 | 2/1994 |
| DE | 196 41 431 A1 | 4/1998 |

(Continued)

OTHER PUBLICATIONS

Ferreira, A.S. and Massarani, G., "Physico-mathematical Modeling of Crossflow Filtration", 2005, Chemical Engineering Journal, vol. 111, pp. 199-204.*

(Continued)

*Primary Examiner* — Mohammad Ali
*Assistant Examiner* — Kelvin Booker
(74) *Attorney, Agent, or Firm* — King & Spalding LLP (57) ABSTRACT

The invention relates to a method for controlling and/or regulating an industrial process for producing or processing products, wherein a physicomathematical model of the industrial process is formed, with which control parameters for controlling or regulating the industrial process are calculated during the production or processing of the product, a number of measurement values is detected, and the model is corrected with a number of primary correction factors, the number of primary correction factors being equal to the number of measurement values. The method is characterized in that the model is corrected with a number of secondary correction factors, such as with a correction factor reflecting the speed of the phase conversion in the rolling mill to be cooled, and in that the number of all correction factors is greater than the number of all measurement values, wherein at least the secondary correction factors are calculated numerically.

20 Claims, 4 Drawing Sheets

U.S. PATENT DOCUMENTS

| | | | |
|---|---|---|---|
| 5,518,064 A * | 5/1996 | Romanowski et al. | 164/453 |
| 5,584,336 A * | 12/1996 | Romanowski et al. | 164/453 |
| 5,600,758 A * | 2/1997 | Broese et al. | 700/37 |
| 5,673,368 A * | 9/1997 | Broese et al. | 706/23 |
| 5,691,895 A * | 11/1997 | Kurtzberg et al. | 700/29 |
| 5,727,127 A * | 3/1998 | Schulze Horn et al. | 706/52 |
| 6,473,658 B1 | 10/2002 | Bröse et al. | |
| 6,529,780 B1 * | 3/2003 | Soergel et al. | 700/10 |
| 6,600,963 B1 | 7/2003 | Loise et al. | |
| 6,636,978 B1 * | 10/2003 | Kirihata et al. | 713/400 |
| 6,662,059 B2 * | 12/2003 | Ito et al. | 706/25 |
| 6,866,729 B2 | 3/2005 | Gramckow et al. | |
| 6,975,974 B2 * | 12/2005 | Chien et al. | 700/121 |
| 6,985,792 B2 * | 1/2006 | Tomelleri | 700/176 |
| 7,006,878 B2 * | 2/2006 | Schweizerhof et al. | 700/51 |
| 7,062,508 B2 * | 6/2006 | Andreev et al. | 1/1 |
| 7,065,419 B2 * | 6/2006 | Wu et al. | 700/97 |
| 7,085,619 B2 * | 8/2006 | Broese et al. | 700/30 |
| 7,257,518 B2 * | 8/2007 | Alba | 703/2 |
| 7,310,981 B2 | 12/2007 | Kurz et al. | |
| 7,496,619 B2 * | 2/2009 | Aldroubi et al. | 708/446 |
| 2002/0143417 A1 * | 10/2002 | Ito et al. | 700/95 |
| 2003/0097197 A1 * | 5/2003 | Parent et al. | 700/108 |
| 2003/0167156 A1 * | 9/2003 | Alba | 703/2 |
| 2005/0131572 A1 * | 6/2005 | Broese et al. | 700/148 |
| 2005/0228511 A1 * | 10/2005 | Das et al. | 700/28 |
| 2006/0111804 A1 * | 5/2006 | Lin | 700/110 |
| 2006/0122834 A1 * | 6/2006 | Bennett | 704/256 |
| 2006/0212209 A1 * | 9/2006 | Cesario et al. | 701/106 |
| 2007/0088524 A1 | 4/2007 | Burvenich | |
| 2008/0077267 A1 * | 3/2008 | Ishibuchi et al. | 700/112 |
| 2008/0152217 A1 * | 6/2008 | Greer | 382/155 |
| 2009/0005953 A1 * | 1/2009 | Cesario et al. | 701/102 |
| 2009/0117647 A1 * | 5/2009 | Buddhi Srinivasa et al. | 435/289.1 |
| 2010/0163761 A1 * | 7/2010 | Febo | 250/573 |
| 2011/0218727 A1 * | 9/2011 | Cesario et al. | 706/32 |

FOREIGN PATENT DOCUMENTS

| | | |
|---|---|---|
| DE | 198 51 554 A1 | 5/2000 |
| DE | 102 03 787 A1 | 8/2003 |
| DE | 103 21 792 A1 | 12/2004 |
| EP | 12 44 816 | 3/2004 |
| RU | 99120177 A | 8/2008 |
| WO | WO 2004/099899 | 11/2004 |
| WO | WO 2005/021811 | 3/2005 |

OTHER PUBLICATIONS

Georgiadis, M.C.; Rotstein, G.E. and Macchietto, S., "Modeling and Simulation of Shell and Tube Heat Exchangers Under Milk Fouling", Apr. 1998, AIChE Journal, vol. 44, No. 4.*

Panchal, C.B. and Rabas, T.J., "Fouling Characteristics of Compact Heat Exchangers and Enhanced Tubes", Jun. 1999, Energy Systems Division, Argonne National Laboratory [also see Proceedings of the Conference on Compact Heat Exchangers and Enhancement Technology for the Process Industries, Banff, Canada].*

Srinivasan, R.S.; Wood, K.L. and McAdams, D.A., "Functional Tolerancing: A Design for Manufacturing Methodology", 1996, Research in Engineering Design, vol. 2, pp. 99-115.*

Crama, Y.; Pochet, Y. and Wera, Y., "A Discussion of Production Planning Approaches in the Process Industry", Jun. 2001, University of Liege, Boulevard du Rectorat, Catholic University of Louvain, Voie du Roman and University of Liege and Corman S.A., Route de la Gileppe.*

Unofficial English language translation of the specification and the claims of German Application No. DE 198 51 554 A1.

Remn-Min Guo: "Modeling and Simulation of Run-Out Table Cooling Control Using Feedforward-Feedback and Element Tracking System," IEEE Transactions on Industry Applications, Magazine, vol. 33, No. 2, pp. 304-311, (1997).

Search Report dated Jun. 16, 2009, issued in a corresponding German Application No. DE 10 2007 024 447.6-55 and its automatic generated translation.

* cited by examiner

METHOD FOR CONTROLLING AND/OR REGULATING AN INDUSTRIAL PROCESS

CROSS-REFERENCE TO RELATED APPLICATIONS

This application is a national phase entry of and claims the benefit of priority to International Application No. PCT/EP2007/059053, filed Aug. 30, 2007, which claims the benefit of priority to German Application No. DE 10 2006 048 031.7, filed Oct. 9, 2006, and to German Application No. DE 10 2007 025 447.6, filed May 31, 2007, all of which are incorporated by reference in their entirety.

FIELD OF THE INVENTION

The present invention relates to a method for controlling and/or regulating an industrial process.

BACKGROUND

During the control of various processes in industry, for example during the control and/or regulation of a cooling line downstream of a hot strip mill train, the problem arises that, as a rule, measurements can be made only at the input of the line and at the end of the line, but that no intermediate measuring stations are possible. Such lines can, however, be very long—for example being the cooling line of a hot strip mill train in the case of which the hot rolled strip has to be sprayed with cooling water over a relatively long length and be cooled thereby. Consequently, the problem arises that the measured values measured at the end of the cooling line can be converted only with a large dead time into regulated variables for regulation of the line, and that there are available for the control elements distributed over the line only the regulated variables calculated on the basis of the values measured at the start and at the end of the line, but no intermediate values.

SUMMARY

To this end, it is known in general from automatic control engineering to use known physicomathematical relationships to devise a model of the line, and to use the model to calculate computed values for regulation or, if appropriate, to calculate reference input variables for a controller. Such a method is described, for example, in our own patent EP 1 244 816 B1. In this case, the cooling line downstream of a hot strip mill train is regulated with the aid of a physicomathematical model in which the cooling process is stored and that receives as input variables material parameters of the strip to be rolled, and measured temperatures at the start and at the end of the cooling line. In this case, the model and the temperatures calculated thereby are used to determine valve positions of cooling water spray valves arranged along the cooling lines. These values are corrected, with the aid of the coiling temperature values measured at the end of the cooling line, in accordance with a further logic based on physical relationships in order thus to determine a cooling curve that approaches to as great an extent as possible the actual cooling curve, and to be able to undertake an appropriate regulation of the cooling line.

It has emerged in this case that the input parameters of the physicomathematical model cannot include all the variables decisive for the cooling curve, at least not with adequate accuracy, in order to calculate with optimum accuracy a cooling occurring under actual manufacturing conditions. Consequently, it has been proposed that the calculation of calculated actual values by means of physicomathematical models be optimized with the aid of statistical methods in the case of such control and/or regulation methods.

A corresponding regulation method of an industrial process, specifically the cooling line of hot strip mill trains is to be gathered from our own patent application DE 102 03 787 A1. Here, use is made of the fact that the physicomathematical model of the cooling line is continuously corrected over the period of the cooling of a metal strip to be cooled, an optimum correction factor being established at the end of this cooling time for each strip. Together with the input variables of the model, specifically the material parameters of the rolled strip and the temperatures and/or the temperature profile at the measuring points this correction factor is stored in a product data record and is available during cooling of subsequent rolled sheets for correction of the sheet then to be cooled. If a sufficient quantity of such product data records are stored, recourse may be had to the existing product data records during a new cooling process in a physicomathematical model. In this case, data records with parameters that are as similar as possible to the sheet to be newly rolled, and the correction factors determined empirically at that time and stored there can be used to correct the model for the cooling process of the sheet to be newly rolled.

Here, there are various statistical methods available for the selection of the suitable product data record(s) or for the weighted calculation of a statistically corrected correction factor, for example an adaptation, described in the introduction of DE 102 03 787 A1, with the aid of heredity tables or with the aid of neural networks, and the calculation of the correction factor with the aid of the correction factors, weighted in accordance with their similarity to the rolled strip to be newly cooled, of previously cooled rolled strips.

This method exhibits the best results so far for many processes that are to be controlled or to be regulated, in particular for the cooling line of hot rolling trains.

Starting herefrom, it is an object of the present invention to develop a method of the generic type in such a way that it exhibits a higher accuracy, and/or can be applied in a broader application sector.

This object is achieved with the aid of the features described herein. In one exemplary embodiment, a method for controlling and/or regulating an industrial process (10) for manufacturing or processing products (100), for example the cooling line (10) of a hot strip mill for producing steel strips or sheet metal strips (100), a physicomathematical model (15) of the industrial process (10) being formed that is used to calculate controlled variables to control or regulate the industrial process, for example the desired valve positions of cooling water valves (11, 11', 12, 12', . . . ) arranged along the cooling line (10), a number (M) of measured values (TF−TH) being acquired during the manufacture or processing of the product (100), for example the temperature difference (TF−TH) at the input (TF) of the cooling line (10) and at the output (TH) of the cooling (10) during the production of the strip (100), and the model (15) being corrected with the aid of a number (M) of primary correction factors (k1), for example with the aid of a correction factor (k1) reflecting the heat transfer from the strip (100) to be cooled into the environment, the number (M) of primary correction factors (k1) being equal to the number (M) of measured values (TF−TH), characterized in that the model (15) is corrected with the aid of a number (N−M) of secondary correction factors (k2), for example with the aid of a correction factor (k2) reflecting the speed of the phase transformation in the strip (100) to be cooled, and the number (N) of all the correction factors (k1, k2) being greater than the number (M) of all the measured values (TF−TH), at least the secondary correction factors (k2) being calculated numerically.

The inventor has realized that controlling or regulating a process or an industrial plant such as, for example, the cooling line of a hot strip mill requires taking into consideration a number of parameters in order to achieve optimum results. However, it is frequently only possible to measure one or a few variables to serve as input variable for the model, whereas two or more parameters are decisive for the correction of the model calculations. Therefore, according to the invention, a method is proposed with the aid of which N correction factors for the model calculation are determined with the aid of M possible measured values, in which case N>M.

This method is particularly suitable for an accurate regulation of the cooling line of a hot strip mill. Here, a first parameter is a function of the heat transfer of the respective strip to the environment, and a second parameter is a function of the speed of the phase transformation of the respective strip, although only a temperature measurement is available as measured value. As the inventor has further realized, according to the method known from DE 102 03 787 A1, the two parameters cannot be corrected statistically on the basis of the correction factors stored in the product data records of previously rolled and cooled strips. The point is that even if both parameters and correction factors were stored in the product data records there is only one equation available for determining two unknowns in the local model of the product to be newly manufactured, and so several mathematically possible solutions are yielded but it is not established which of them is physically most sensible. Again, averaging out the possible solutions does not achieve the goal in this case.

It is therefore proposed according to the invention to improve the method described in patent specification EP 1 244 816 B1 to the effect that the model is corrected not only with the aid of a number of primary correction methods (with the aid of a correction factor reflecting the heat transfer from the sheet to be cooled into the environment, in the case of the regulation of a cooling line of a hot strip mill), but also with the aid of a number of secondary correction factors (with the aid of a correction factor reflecting the speed of the phase transformation in the strip to be cooled, in the case of the regulation of the cooling line). Because there is available here for the determination of the correction factors only a number of measured values corresponding to the number of primary correction factors (in the case of the cooling line, a measured value, specifically a temperature or temperature difference or the profile thereof), at least the secondary correction factor(s), preferably also the primary correction factor(s), is/are calculated numerically according to the invention by using suitable approximation or optimization methods or other algorithms.

Particularly for the cooling line of a hot strip mill, but also for other comparable processes or plants, the method promises a good solution in this case when further parameters come into play in the regulation or control in addition to a primary parameter, here the heat transfer, for example. Thus, for example, it has so far not been possible to attain an even approximately satisfactory solution in the case of the cooling line for the production of high carbon steel strips, since no account has been taken of the influence of microstructural transformation. High carbon steel strips are therefore traditionally produced with a low coiling temperature quality. Only with the inventive method is success achieved in generating a good approximation for the adaptation of the model of the cooling line by the inclusion of the influence of the phase transformation in the cooled strip and/or of the speed of the microstructural transformation as a function of the process conditions in addition to the influence of the heat transfer.

In this case, the correction factors are advantageously determined from the model and the measured value(s) with the aid of an, in particular, iterative optimization algorithm, by specifying a multiplicity of test values for each correction factor to be determined with the aid of the algorithm, and by attempting to use iterative serial trial to find the most suitable value. It has proved to be particularly advantageous in this case when the correction factors are determined with the aid of experience gained in earlier instances of processing or manufacturing.

To this end, during the processing or manufacture of any product specific experience is recorded in a product data record, together with the input variables for this manufacture or processing, for example product related parameters or plant related parameters.

However, now it is not the correction factors selected during the processing or manufacture of a product that are stored as experience or as empirical values, but the information indicating for which set of correction factors it is possible to attain good results. For each product that is to be processed anew or currently, the correction factors are then determined not from the correction factors of the similar strips, but from the above information and/or other suitable data that are determined in relation to each already processed product, or that have been stored in the respective product data records.

The empirical values are to be stored in this case in each product data record such that it is still possible later to find all the possible solutions for the correction factors. Only during the manufacture or processing of the current product is it then possible to determine the values of the primary and secondary correction factors valid for the current product by the synopsis of a number of product data records qualified as resembling the current product. The fixing on concrete values for each correction factor is thus not performed directly after the production of the assigned product, and thus also not a corresponding storage of the correction factors, fixed on a concrete value, with the product data record of the respective product. Rather, the correction factors, which are to be assigned to a product data record qualified as similar in the production of a new product are not determined until after the determination of the similar strips.

It would likewise be conceivable also to determine the number of primary and secondary correction factors from the product data records.

It is advantageously possible with the aid of this statistical approach to use a number of measured values that is smaller than the number of parameters to carry out a statistical correction of the model calculation in a plurality of directions in order to do justice to all parameters, although the number of measurements is smaller than the number of directions in which the model is to be corrected.

Here, in the case of a cooling line, which is to be regulated, of a hot strip mill, the carbon content, the manganese content, the thickness and width of the strip, as well as the strip feed rate and other input variables come into consideration here as input variables to be stored in the product data record of the respective product. It is then possible to compare the respective parameters with the parameters of the stored product data records for each product that is newly to be processed, in order thus to determine a number of similar product data records. Here, the production data records can be stored, for example, in a circulating memory using the FIFO principle, the oldest product data records thus being deleted when there is no longer any space available for new product data records such that product data records as up to date as possible are always being used for the comparison with the current product values.

In an advantageous development, in addition to the input parameters it is possible here to acquire a number of measured values that corresponds to the number of primary correction factors, and to store it in the respective product data record, in the case of the cooling line, for example the profile of the coiling temperature at the end of the cooling line over time or the profile of a temperature difference between the coiling temperature and the temperature at the input of the cooling line. The measured values are then used to determine the desired information from which the correction factors are then subsequently to be used to calculate the correction factors for the similar product to be manufactured in the future. This comes about, for example, by virtue of the fact that a number of computed values, calculated with the number of measured values, is stored in the product data record as the number of empirical values. In this case, the calculation is carried out with the aid of the model and of the stored measured values by prescribing a multiplicity of test values for each of the correction factors under consideration and carrying out a model calculation, the computed values respectively being determined as a function of the correction factors and stored. During the manufacture of the product subsequently to be manufactured, or the later product, the computed values stored in the similar product data records are then used to determine suitable correction factors for this product that supply the best result overall for the similar products. Here, the computing value(s) can feature in the measured value(s), or the measured values can be stored separately as a dedicated empirical value in the respective product data records.

As an alternative thereto, instead of the computed values being stored as a function of the correction factors, it is also possible in each case to calculate from the measured values a curve on which a computed value calculated with the aid of the model corresponds to the measured value, the curve being stored as an empirical value. In order to determine suitable correction factors for the product currently to be processed or manufactured, it is then possible to use the product data records determined as similar to determine the desired values of the correction factors so as to ascertain the points of intersection of the curves stored in the similar product data records. The points of intersection can then be used to determine the correction factors for the product currently to be processed, for example by averaging, be this by arithmetic in a weighted fashion or in another suitable way.

A further, alternative method is distinguished in that model calculations are not subsequently carried out using the empirical values stored in the determined similar product data records until during or shortly before the manufacture of the current product. It is then required merely to store the measured value(s) as the empirical values in the product data records. In order to determine the correction factors, a multiplicity of test values is prescribed once again for the desired correction factors, and the model calculations are carried out repeatedly with the aid of the prescribed test values so as to yield the optimum values for the correction factors for the current manufacture.

The test values can preferably be prescribed using a mathematical optimization method, for example a method in the case of which a target function is formed that is maximized or minimized.

Finally, the calculation can be further improved by correcting the determined correction factors with the aid of the current measured values, for example by means of a gradient descent method.

The individual features of the embodiments as claimed in the claims can be combined as desired to the extent that appears sensible. It goes without saying here that the above-named features and those still to be explained below can be used not only in the specified combination, but also in other combinations or on their own without departing from the scope of the invention.

BRIEF DESCRIPTION OF THE DRAWINGS

Advantageous embodiments of the present invention are explained below with the aid of the attached drawings, in which.

DETAILED DESCRIPTION

Figure 1:
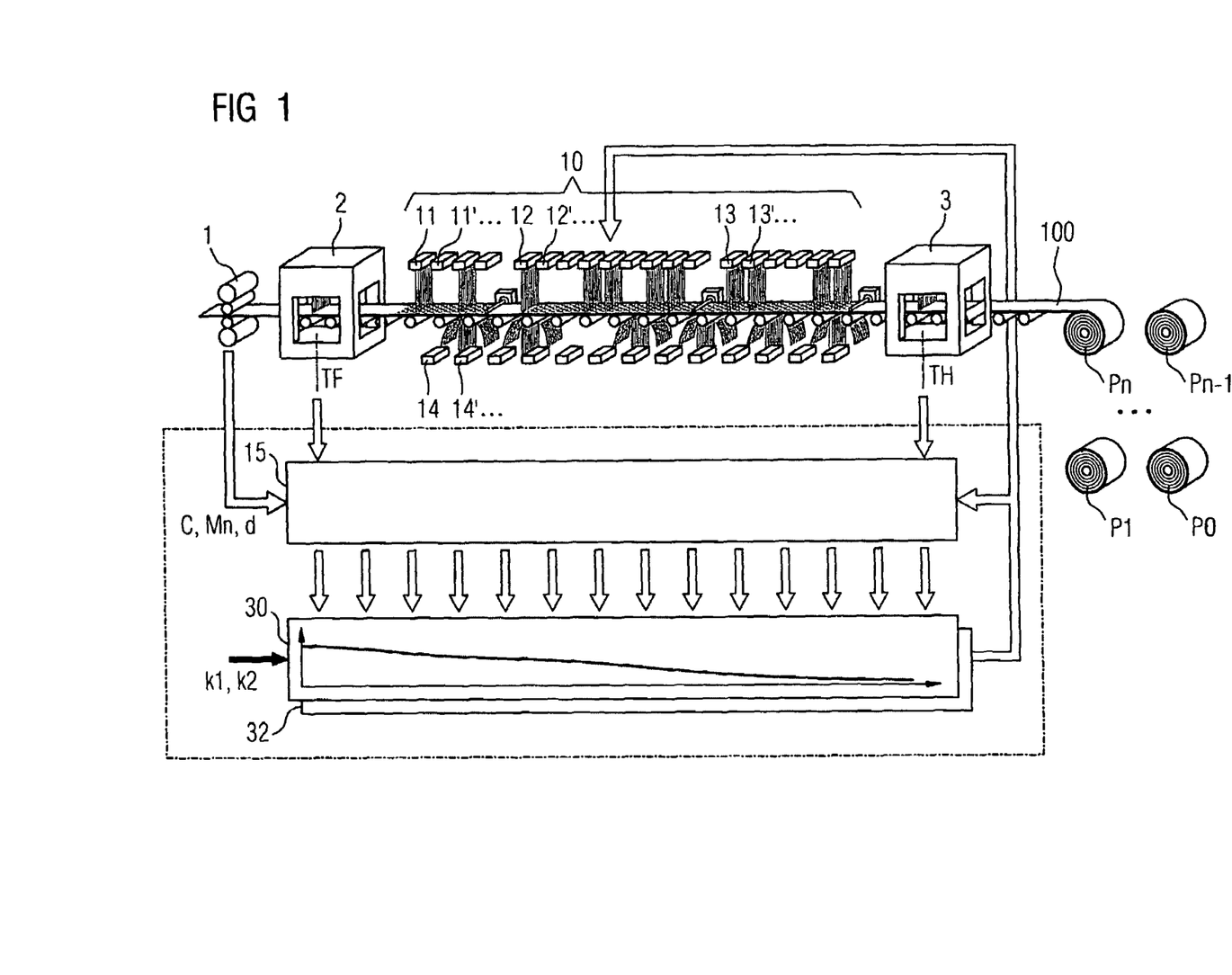
FIG. 1 shows the design of a cooling line downstream of a hot-rolling train, and the regulation thereof.

Reference will first be made to FIG. 1. FIG. 1 is taken from EP 1 244 816 B1 and modified in accordance with the present invention. Reference is made to this patent specification to this extent.

After having passed the last roll stand 1 of the roll train, a rolled strip 100 traverses a cooling line, an input temperature, TF, being measured at a finishing train measuring station denoted by 2, and an output temperature, TH, being measured at a coiling temperature measuring station denoted by 3. Located between the two measuring stations are valve groups 11, 11', 12, 12', 13, 13', 14, 14', . . . , which together form the cooling line 10. The measured temperatures are fed as temperature difference TF−TH to a physicomathematical model 15 of the cooling line. In addition, the model 15 is further fed as input variables material parameters of the strip currently to be cooled, for example a carbon content C of the strip 100, a manganese content Mn of the strip 100, and a thickness of the strip d, and, optionally, the strip speed etc.

The model 15 is now used to calculate individual intermediate values for the temperature over the cooling line in order to be able to set the valve positions of the individual valves therefrom. However, the accuracy of the model is limited here, for example because not all the parameters are accurately known. For example, the heat transfer at the steel surface, and the rate of transformation of the steel are only inaccurately known as a function of the cooled material. Consequently, correction factors denoted by k1, k2 are determined for the model 15, k1 denoting a correction factor that modifies the heat transfer, as assumed in the model, in the strip, and k2 denoting a correction factor that modifies the speed of the phase transformation, as assumed in the model, in the strip. Thus, the model 15 corrected with the aid of the correction factors k1, k2 is used to calculate a desired cooling curve of the strip 100 that is denoted by 30, and a microstructural condition curve that is denoted by 32. The cooling line 10 is then regulated with the aid of the cooling curve 30 and/or the microstructural condition curve 32.

It may be pointed out here that the cooling curve is influenced by the speed of the phase transformation, and that it is therefore also possible to calculate an influence of the speed of phase transformation of the microstructure into the cooling curve in order to regulate the cooling line 10 thereby.

Figure 2:
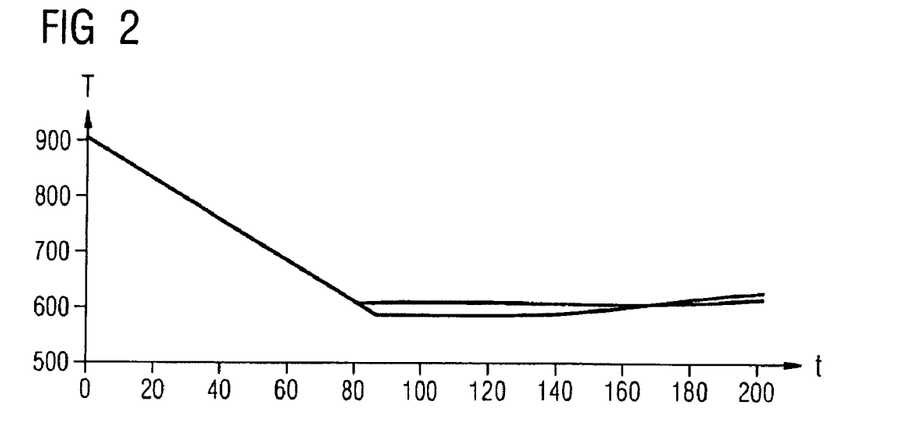
FIG. 2 shows a diagram indicating a cooling curve of two different strips.

FIG. 2 shows such a cooling curve of a reference strip that has been cooled with slightly varying valve settings. The temperature T is plotted against the time t. It is to be seen that the cooling profile of the reference strip differs at different valve settings, and is thus a function of the valve positions.

Figure 3:
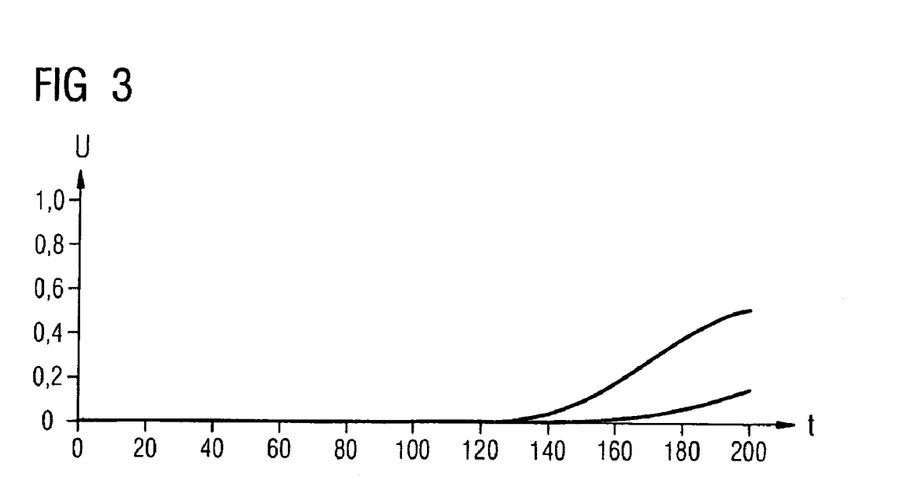
FIG. 3 shows a diagram indicating the time profile of a degree of microstructural transformation of two strips.

By contrast, FIG. 3 reproduces the influence of the valve positions on the rate of transformation of the reference strip during cooling. Here, the speed U of microstructural transformation is plotted in the diagram against the time t, the microstructural condition curve of the reference strip being plotted for slightly different valve settings. It is to be seen that variations occur in the microstructure of the two strips, and this is undesired. The accuracy of the control depends in this case on how accurately the variations can be described with the aid of a model. Consequently, a corrective model is advantageous.

Thus, M=1 measurements (the measured values TF–TH) per strip are available for determining the N=2 correction factors k1, k2. In accordance with the present embodiment of the invention, the stored product data records of previously manufactured products P0 to Pn−1 are used in order to determine the two correction factors k1, k2 for the product currently to be manufactured, specifically a coil Pn or a coiler within the cooled strip 100 coiled up thereon. Reference may be made for this end to FIGS. 4 to 6.

A curve for this can be stored in the product data records PD0 to PDn of each product, which curve reproduces the temperature calculated by the model for various value pairs of the correction factors k1, k2. An example of such a curve is reproduced in FIG. 4. Here, PD0 to PDn−1 are stored product data records of preproduced products, and PDn is the product data record still to be compiled in the case of the product currently to be manufactured, which can then be used in the manufacture of the next product Pn+1.

Figure 4:
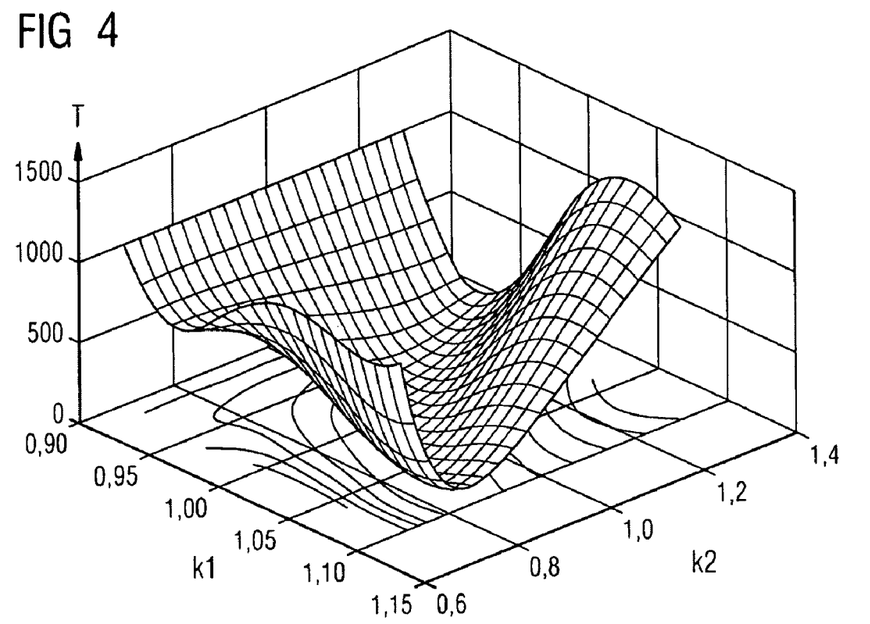
FIG. 4 shows a curve reflecting the temperature, calculated by model, for each pair of suitable correction factors.
Figure 5:
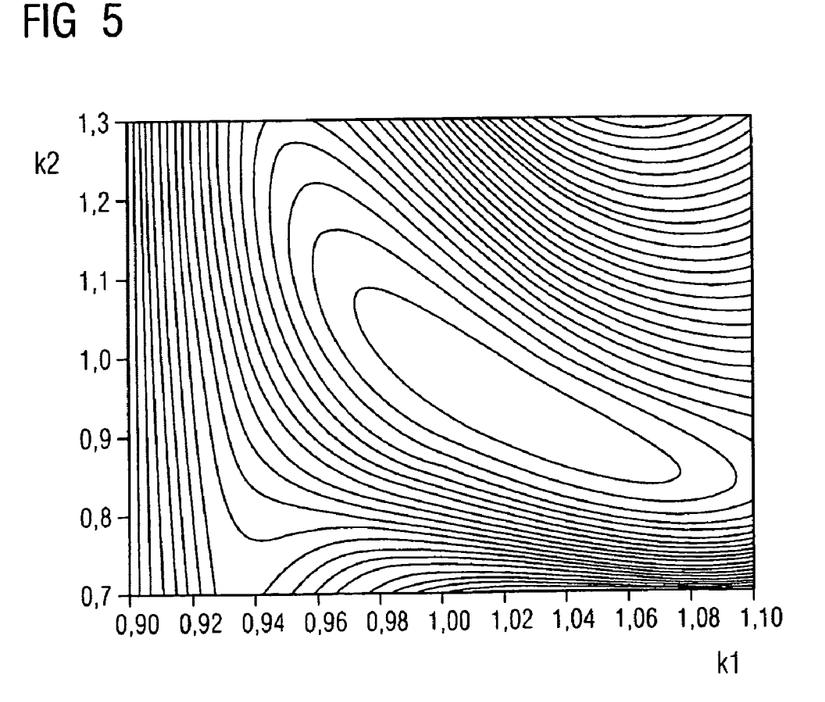
FIG. 5 shows a diagram in which isotherms are illustrated in a plane defined by a pair of correction factors.

FIG. 5 shows an illustration of isotherms of the curve from FIG. 4 in a plane defined by the correction factors k1, k2. It is to be seen that there is a set of suitable value pairs k1, k2 that lie on the isotherms for each desired temperature. It would also be conceivable to store in the form shown in FIG. 5.

Figure 6:
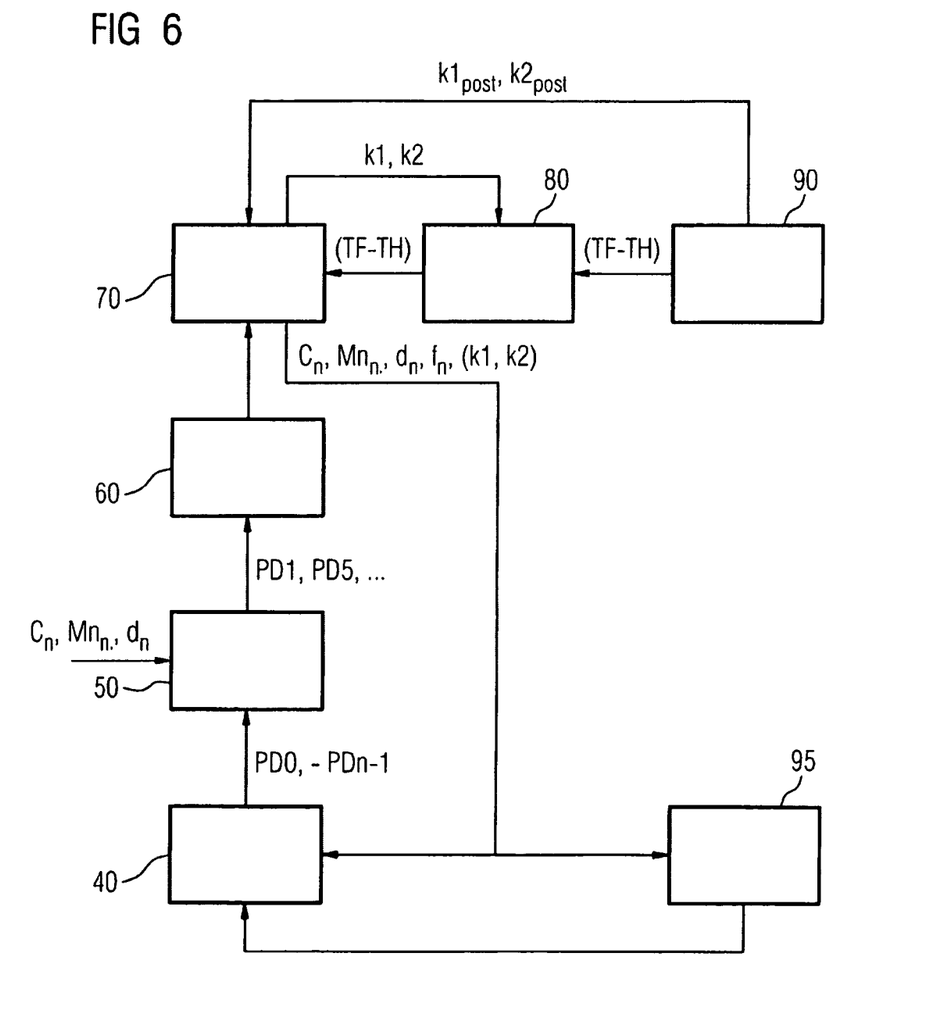
FIG. 6 shows a flowchart for calculating the model correction of the regulation used for the cooling line shown in FIG. 1.

The correction factors k1, k2 for the product Pn currently to be manufactured are now determined by synopsis according to the flowchart shown in FIG. 6 from the values stored in relation to the preceding products in the product data records PD0 to PDn−1. Here, 40 denotes a memory unit in which the product data records of the previously manufactured products P0 to Pn−1 are stored. Suitable product data records, specifically ones similar to the product Pn currently to be manufactured, are selected from this memory with the aid of a search device 50. To this end, the search device 50 compares the material parameters (and, optionally the manufacturing plant parameters) of the product Pn currently to be manufactured with the stored product data records of the previously manufactured products Pn−1 to P0.

In the illustrated example as material parameters of the product Pn currently to be manufactured the carbon content $C_n$, the manganese content $Mn_n$, as well as the thickness $d_n$ of the product Pn currently to be manufactured are compared with the corresponding material parameters, stored in the stored product data records P0-Pn−1 of the previously manufactured products. It is then decided on this basis which product data records are regarded as similar (PD1, PD5, ... in the example illustrated), and which are not. The similar product data records PD1, PD5, ... are now used to calculate correction factors k1, k2 for the product currently to be manufactured, and fed for this purpose to an arithmetic logic unit 60. The arithmetic logic unit 60 calculates solutions in this case by determining the minima of a function in accordance with the following equation:

$$\mathrm{Min}\left(\sum_{i=1}^{l} gi(f_i(k1, k2) - Ti)^2\right)$$

where l corresponds to the number of the similar products (PD1, PD5, ... in the example), gi corresponds to a weighting factor that depends on the age of the respective product data record, $f_i(k1, k2)$ corresponds to the computed value, stored as a function of the correction factors k1, k2, in accordance with FIG. 4, and $T_i$ corresponds to the temperature actually measured in the case of the respective product.

The age of the product data records can be optionally incorporated in this case in order to keep as small as possible the influence of a drift in short lived parameters because of the changeability of the system, for example owing to maintenance or ageing. This is not required, however, in the optimum case. Consequently, the age can be taken into account, but need not be. The instantaneously measured temperature values TF–TH feature in the real time monitoring unit 80, and so a correction of the correction values k1, k2, for example with the aid of a gradient descent method, can be carried out in a post calculating unit 90 with the aid of the measured temperature value TF–TH.

The corrected correction values $k1_{post}$, $k2_{post}$ are then returned into the precalculating unit 70 and can be used to control or regulate the line.

Upon termination of the production of the product Pn currently to be produced, the material characteristics $T_n$, $Mn_n$, dn, as well as the function $f_n(k1, k2)$ of the temperatures calculated for the correction factors are stored in a product data record and fed to the memory unit 40. Here, 95 denotes a backup memory intended to serve as redundant security for the product data memory 40.

Of course, variations and modifications of the example illustrated are conceivable within the scope of the invention.

The invention claimed is:

1. A computer-implemented method for controlling and/or regulating an industrial process (10) for manufacturing or processing products (100), the method comprising:

forming, by a computer, a physicomathematical model (15) of the industrial process (10) to calculate controlled variables to control or regulate the industrial process;

acquiring, by the computer, a number (M) of measured values (TF–TH) during the manufacture or processing of the product (100); and correcting, by the computer, the model (15) with the aid of a number (M) of primary correction factors (k1), the number (M) of primary correction factors (k1) being equal to the number (M) of measured values (TF–TH), wherein the model (15) is corrected with the aid of a number (N−M) of secondary correction factors (k2), and a number (N) of all the correction factors (k1, k2) being greater than the number (M) of all the measured values (TF–TH), at least the secondary correction factors (k2) being calculated numerically, wherein the correction factors (k1, k2) are determined from the model (15) and the number (M) of the measured values (TF−TH) with the aid of an iterative optimization algorithm in the case of which a multiplicity of test values are specified for each of the correction factors (k1,k2), and wherein the optimization algorithm follows a gradient descent method of optimization.

2. The method according to claim 1, wherein the test values are prescribed using a mathematical optimization method in the case of which a target function is formed that is maximized or minimized.

3. The method according to claim 1, wherein each of the primary correction factor (k1) is formed from the difference between a value calculated with the aid of the model (15) and one of the measured values (TF−TH), the number (M) of primary correction factors (k1) and the number (M) of measured values (TF−TH) being equally large.

4. The method as claimed in one of claims 1 or 3, characterized in that in relation to each product (P0-Pn) characteristic input variables (C, Mn, d, . . . ), and a number (M) of empirical values (TF−TH; f(k1, k2); [k1(s), k2(s)]) reproducing experience gained in the manufacture or processing of the product (P0-Pn) are stored as product data record (PD0-PDn), if sufficient stored product data records (PD0-PDn−1) are present, a comparison of the characteristic input variables (C, Mn, d, . . . ) of the current product (Pn) with the characteristic input variables (C, Mn, d, . . . ) in the product data records (PD0-PDn−1) of previously manufactured or processed products (P0-Pn−1) is used to select similar product data records (PD1, PD5, . . . ), the correction factors (k1, k2) of the current product (Pn) being determined with the aid of the empirical values (TF−TH; f(k1, k2); [k1(s), k2(s)] stored in the similar product data records (PD1, PD5, . . . ).

5. The method according to claim 4, wherein during the manufacture or processing of each product (P0-Pn) at least a number (M), corresponding to the number (M) of primary correction factors (k1), of measured values (TF−TH) is acquired, a multiplicity of test values are specified for each of the correction factors (k1, k2), with the aid of the model, the number (M) of measured values (TF−TH) and the multiplicity of test values a number (M) of computed values (f(k1, k2)) is respectively determined as a function of the correction factors (k1, k2), and the number (M) of computed values (f(k1, k2)) is stored as the number (M) of empirical values (f(k1, k2)), after the determination of the similar product data records (PD1, PD5, . . . ), the computed values (f(k1, k2)) of the similar product data records (PD1, PD5, . . . ) are used to determine for the current product (Pn) suitable correction factors (k1, k2) that supply the best result for the similar products.

6. The method according to claim 5, wherein the number of measured values (TF−TH) features in the number (M) of computed values (f(k1, k2)).

7. The method according to claim 5, wherein the number of measured values is respectively stored as separate empirical value.

8. The method according to claim 4, wherein during the manufacture or processing of the product (Pn) at least a number (M), corresponding to the number (M) of primary correction factors (k1), of measured values (TF−TH) is acquired, a multiplicity of test values are specified for each of the correction factors (k1, k2), and with the aid of the model and the number (M) of measured values (TF−TH) and the multiplicity of test values an N-M-dimensional surface, is calculated on which a computed value calculated with the aid of the model corresponds to the measured value (TF−TH), the N-M-dimensional surface being stored as empirical value (f(k1, k2)), N being the number of all the correction factors(k1, k2), and M the number of available measured values, and after the determination of the similar product data records (PD1, PD5, . . . ) of the similar product data records (PD1, PD5, . . . ), are used to determine for the current product suitable correction factors (k1, k2) that supply the best result for the similar products.

9. The method according to claim 8, wherein N-M-dimensional surfaces ([k1(s), k2(s)]) stored in the similar product data records (PD1, PD5, . . . ) are used to ascertain the points of intersection of the N-M-dimensional surfaces [(k1(s), k2(s)]) stored in the similar product data records (PD1, PD5, . . . ) in order to determine suitable correction factors (k1, k2).

10. The method according to claim 9, wherein suitable correction factors (k1, k2) are determined from the points of intersection by averaging.

11. The method according to claim 4, wherein the product data records (PD0-PDn) stored in relation to each product (P0-Pn) permit a subsequent model calculation, and a number (M), corresponding to the number (M) of primary correction factors (k1), of measured values (TF−TH) is stored as the number (M) of empirical values (TF−TH), test values suitable for each of the correction factors (k1, k2) being repeatedly prescribed in order to determine the correction factors (k1, k2) for the current product (Pn), and the respectively prescribed test values for each similar product data record (PD1, PD5, . . . ) being used to compare the measured values (TF−TH) stored there with calculated values that are calculated with the aid of a model calculation carried out on the basis of the values stored in the respective similar product data record, and use subsequently being made as correction factors (k1, k2) of those test values that have supplied the best results for the similar product data records.

12. The method according to claim 4, wherein the industrial process (10) for manufacturing or processing products (100) is a cooling of a hot strip mill for producing steel strips or sheet metal strips in a cooling line and wherein at least one of the characteristic input variables is selected from the group consisting of sheet thickness, sheet width, carbon content, and manganese content.

13. The method according to claim 4, wherein the determined correction factors (k1, k2) are corrected by means of current measured values (TF−TH) in, or virtually in real time.

14. The method according to claim 1, wherein the industrial process (10) for manufacturing or processing products (100) is a cooling of a hot strip mill for producing steel strips or sheet metal strips in a cooling line.

15. The method according to claim 14, wherein the controlled variables control or regulate desired valve positions of cooling water valves (11, 11', 12, 12', . . . ) arranged along the cooling line (10).

16. The method according to claim 14, wherein the number (M) of measured values (TF−TH) acquired during the manufacture or processing of the product (100) comprises the temperature difference (TF−TH) at the input (TF) of the cooling line and at the output (TH) of the cooling line during the production of the strip.

17. The method according to claim 14, wherein correcting the model (15) with the aid of a number (M) of primary correction factors (k1) comprises the aid of a correction factor (k1) reflecting the heat transfer from the strip to be cooled into the environment.

18. The method according to claim 14, wherein the number (N−M) of secondary correction factors (k2) comprises a correction factor (k2) reflecting the speed of the phase transformation in the strip to be cooled.

19. A non-transitory computer-readable storage medium storing instructions that when executed by a computer cause the computer to perform a method for regulating an industrial process (10) for manufacturing or processing products (100), the method comprising:
- forming, by a computer, a physicomathematical model (15) of the industrial process (10) to calculate controlled variables to control or regulate the industrial process;
- acquiring, by the computer, a number (M) of measured values (TF−TH) during the manufacture or processing of the product (100); and
- correcting, by the computer, the model (15) with the aid of a number (M) of primary correction factors (k1), the number (M) of primary correction factors (k1) being equal to the number (M) of measured values (TF−TH), wherein the model (15) is corrected with the aid of a number (N−M) of secondary correction factors (k2), and the number (N) of all the correction factors (k1, k2) being greater than the number (M) of all the measured values (TF−TH), at least the secondary correction factors (k2) being calculated numerically,
- wherein the correction factors (k1, k2) are determined from the model (15) and the number of the measured values (TF−TH) with the aid of an iterative optimization algorithm in the case of which a multiplicity of test values are specified for each of the correction factors (k1,k2), and
- wherein the optimization algorithm is a gradient descent method.

20. A computer-implemented method for controlling and/or regulating an industrial process (10) for manufacturing or processing products (100), the method comprising:
- forming, by a computer, a physicomathematical model (15) of the industrial process (10) to calculate controlled variables to control or regulate the industrial process;
- acquiring, by the computer, a number (M) of measured values (TF−TH) during the manufacture or processing of the products (100);
- correcting, by the computer, the model (15) with the aid of a number (M) of primary correction factors (k1), the number (M) of primary correction factors (k1) being equal to the number (M) of measured values (TF−TH);
- correcting, by the computer, the model (15) with the aid of a number (N−M) of secondary correction factors (k2), a number (N) of all the correction factors (k1, k2) being greater than the number (M) of all the measured values (TF−TH), wherein at least the secondary correction factors (k2) being calculated numerically;
- storing as product data records (PD0-PDn), by the computer, characteristic input variables (C, Mn, d, . . . ) of each product (P0-Pn) of the products (100), and a number (M) of empirical values (TF-TH; f(k1, k2); [k1(s), k2(s)]) reproducing experience gained in the manufacture or processing of the product (P0-Pn);
- selecting, by the computer, similar product data records (PD1, PD5, . . . ) by comparing the characteristic input variables (C, Mn, d, . . . ) of a current product (Pn) with the characteristic input variables (C, Mn, d, . . . ) in the product data records (PD0-PDn−1) of previously manufactured or processed products (P0-Pn−1), when sufficient stored product data records (PD0-PDn−1) are present, the correction factors (k1, k2) of the current product (Pn) being determined with the aid of the empirical values (TF-TH; f(k1, k2); [k1(s), k2(s)] stored in the similar product data records (PD1, PD5, . . . ); and
- acquiring at least a number (M) corresponding to the number (M) of primary correction factors (k1), of measured values (TF−TH) during the manufacture or processing of each product (P0-Pn), wherein acquiring comprises:
  - determining, with the aid of the model, the number (M) of measured values (TF−TH) and a multiplicity of test values for number (M) of computed values (f(k1, k2)) respectively as a function of the correction factors (k1, k2), the multiplicity of test values are specified for each of the correction factors (k1, k2), and the number (M) of computed values (f(k1, k2)) is stored as the number (M) of empirical values (f(k1, k2)),
  - wherein after determining the similar product data records (PD1, PD5, . . . ), the computed values (f(k1, k2)) of the similar product data records (PD1, PD5, . . . ) are used to determine suitable correction factors (k1, k2) for the current product (Pn), that supply the best result for the similar products.

* * * * *